March 9, 1937.  C. E. QUINN  2,073,176

REFRIGERATING APPARATUS AND METHOD

Filed March 14, 1936  2 Sheets-Sheet 1

INVENTOR.
Clara E. Quinn

BY Darby & Darby

ATTORNEYS.

March 9, 1937.  C. E. QUINN  2,073,176

REFRIGERATING APPARATUS AND METHOD

Filed March 14, 1936  2 Sheets-Sheet 2

INVENTOR.
Clara E. Quinn
BY Darby & Darby
ATTORNEYS.

Patented Mar. 9, 1937

2,073,176

UNITED STATES PATENT OFFICE 2,073,176

REFRIGERATING APPARATUS AND METHOD

Clara E. Quinn, Mount Vernon, Ill., assignor to Driice Appliances Incorporated, Mount Vernon, Ill., a corporation of Delaware Application March 14, 1936, Serial No. 68,862

3 Claims. (Cl. 62—114)

This invention relates to a refrigerating apparatus and particularly an apparatus adapted to freezing ice cream.

An object of this invention is to provide in a simple structure, a mechanism for quickly freezing ice cream, ices and the like.

A further object of this invention is to provide a freezer having a freezing surface which moves into, through and out of a body of liquid confection so that a thin layer of the confection is almost instantly frozen on said surface. The frozen product is then removed from the freezing surface.

It is more specifically an object of this invention to provide a machine in which the freezing surface is in the form of a drum which as it revolves through a body of liquid picks up a thin layer thereof which solidifies quickly and is then scraped from the surface of the drum into a receptacle.

A still further object of this invention is to provide a machine of this type employing a solid, primary, refrigerant, such as ice or solid carbon dioxide, and a secondary, liquid refrigerant which conducts the heat from the layer being frozen to the solid refrigerant.

These and many other objects as will be apparent from the following disclosure, are secured by means of this invention.

Figure 1:
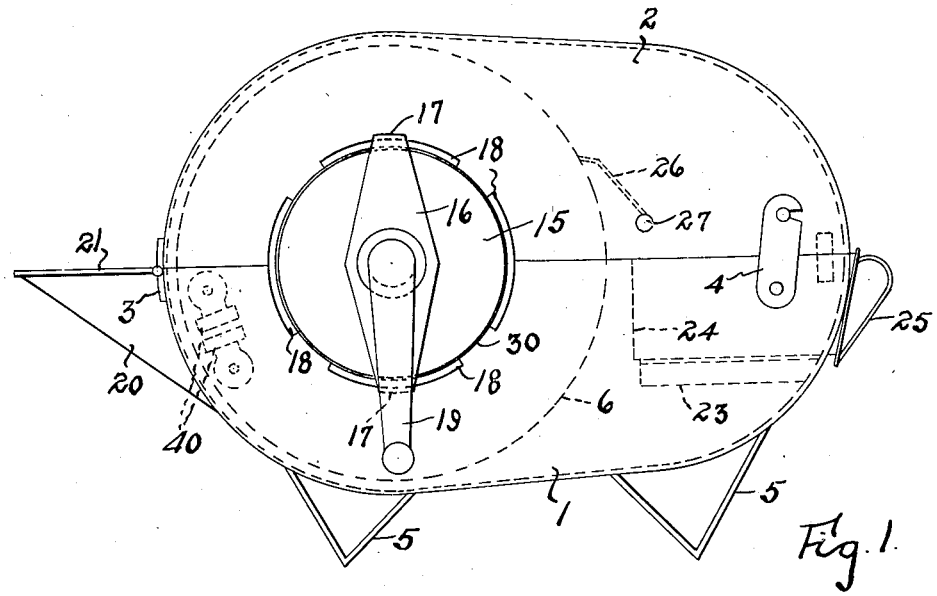
Figure 1 is a front elevational view of one form of this invention.
Figure 2:
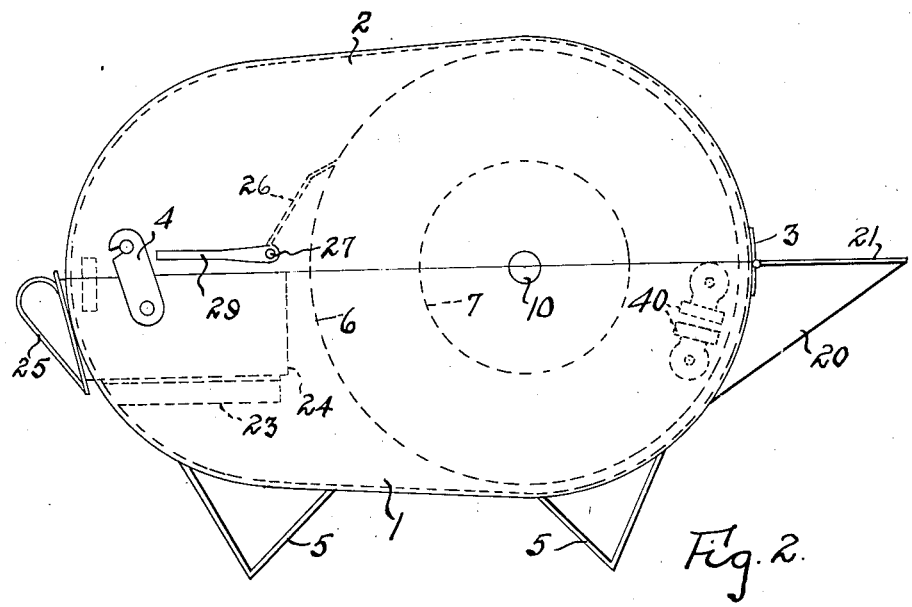
Fig. 2 is a rear elevational view thereof.
Figure 3:
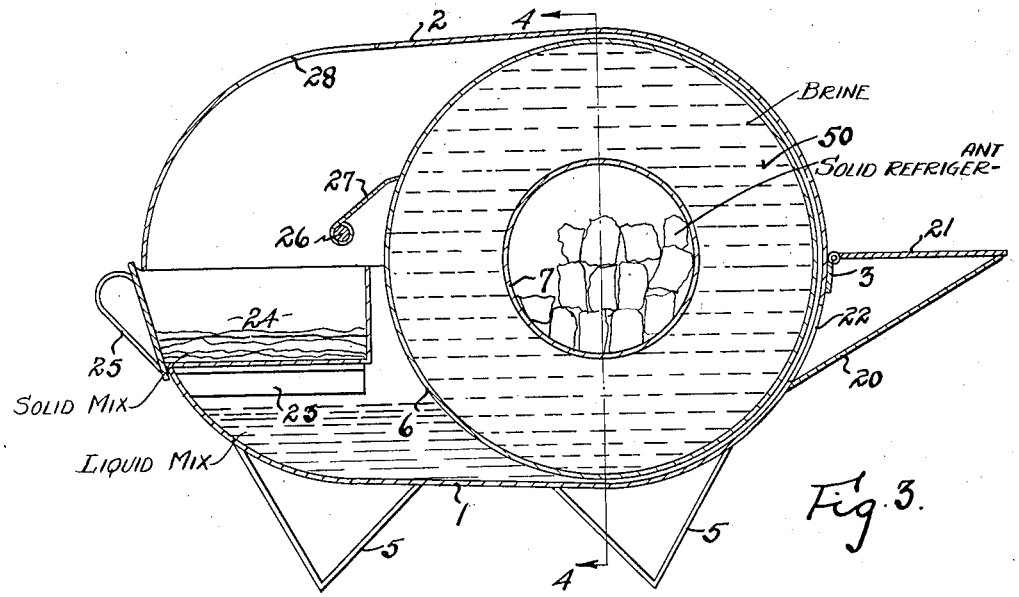
Fig. 3 is a longitudinal, central, vertical, cross sectional view through the device taken on the line 3—3 of Fig. 4.

As it will be apparent from the following description, the machine may take many forms. However, in the form illustrated, it comprises an outer casing or housing comprising a bottom portion 1, and the upper portion 2 which hingedly is connected thereto by means of the hinges 3. At 4 are the latches or catches by means of which the cover portion may be locked in closed position as shown in Figures 1 and 2. The bottom portion is provided with suitable feet or legs 5 for supporting the device. Within the housing is a drum or cylinder 6 which is closed at the end by means of the heads 8 and 9. Mounted centrally of the drum is a tubular core 7 which is welded or otherwise secured to the head 8 to form a sealed joint therewith at one end, and which, at the other end, projects as indicated at 12 through a central hole in the head. The joint between the head 9 and the drum 7, is likewise welded or soldered.

Figure 4:
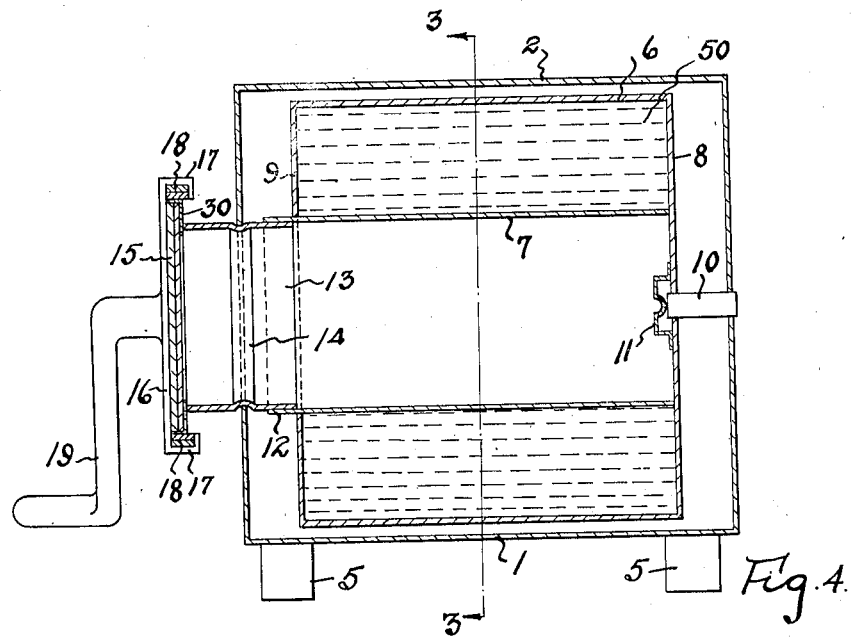
Fig. 4 is a longitudinal, cross sectional view taken on the line 4—4 of Fig. 3.

At 13 is a short cylindrical sleeve which fits snugly within the projecting lip 12 and may be secured thereto, either permanently by means of soldering, or welding, or detachably by means of bolts or the like. The outer casing is provided with a central aperture at the point where the sleeve 13 passes thereto of a diameter to snugly fit within the annular groove 14 formed on the sleeve as shown in Figure 4. On the end of the sleeve is a disc 30 having a flange edge, and a large central opening likewise as shown in Fig. 4.

At 15 is a cylindrical closure member which fits snugly within the flange disc 30 and which may be locked in place by a bar or strap 16 which has a bayonet joint connection therewith. Secured at spaced points around the circumference of the flange disc 30 are the longitudinally curved bars 18, all of which are of increasing width from one end towards the other so that when engaged by the lips 17 on the straps 16, the closure 15 may be securely locked in place. In other words when the strap is slipped into place and given a turn in a direction in which the width of the bars 18 increase, the closure will be sealed in place. Mounted upon or secured to the strap 16 is a hand crank 19. Thus with the cover 2 closed, and the closure 15 locked in place, the drum comprising the cylindrical portions 6 and 7 may be rotated. It is pivotally supported at the annular groove 14 at one end and at the other end on a pivot pin 10 which is welded or otherwise secured to the housing. The drum has a central hole into which the pin fits and is provided with a stop 11 for proper positioning the drum so that the groove 14 is engaged at the periphery of the opening in the outer housing.

The lower portion 1 of the outer housing is provided with a chute or hopper 20 adjacent an opening 22 in the wall of the housing. At 21 is a hinge cover positioned to normally close the hopper. Within the housing are a pair of angle pieces or runners 23 secured to the housing and providing a guide-way for removable receptacle or drawer 24 which may be inserted into and withdrawn from the housing through an opening in the wall thereof by means of the handle 25.

Extending transversely of the housing and pivotally mounted on the cover part 2, is a shaft or rod 26 which is provided with a handle 29, see Fig. 2, outside of the casing by means of which the shaft may be rotated. Secured to the shaft within the housing, is a longitudinal scraper or knife 27 which is positionable against the outer surface of the drum 6. This knife extends throughout the length of the drum. The portion 2 of the housing is provided with an opening or window 28 through which the interior thereof may be observed, and particularly the scraper to determine the condition of the frozen product being removed from the drum wall. As diagrammatically illustrated in the drawings the jacket formed by the cylinders 6 and 7, contains any suitable and known liquid secondary refrigerant which has a freezing point below the operating temperatures of the device so that it may conduct the heat absorbed from material being frozen, to the inner wall 7. The chamber formed by the inner wall 7, sleeve 13 and closure 15 is a receptacle for the solid refrigerant, such as solid carbon dioxide which is put thereinto in the form, preferably of small pieces.

In the operation of the device the solid refrigerant is introduced into the inner drum 7 by removing the closure member 15. It is then replaced and locked in place by means of strap 16 and its bayonet joint connection. With the cover 2 closed, the mix to be frozen is introduced into the housing through the hopper 20 from which it flows through the opening 22. The amount of material introduced into the housing should not be enough to reach up to the drawer 24. The composite drum is then slowly revolved in a counterclockwise direction, carrying a thin layer of the mix with it. By the time the material picked up reaches the scraper 27 it has been frozen solid by the loss of heat to the solid refrigerant through the conducting agency of the secondary refrigerant 50. The scraper 27 removes it from the drum in thin layers and it falls into the drawer 24, by means of which it may be removed from the device. The rate at which the drum is revolving is determined solely by the conditions of the product as observed through the opening 28. As the mix supply is depleted, it is replenished by supplying fresh mix into the hopper 20.

From the above description it will be apparent that this invention resides in certain principles of operation which may be embodied in other physical forms without departure from the scope thereof. I do not, therefore, desire to be strictly limited to the disclosure which has been given for the purpose of illustration, but rather to the scope of the appended claims.

What I seek to secure by United States Letters Patent is:

1. In an apparatus as described the combination comprising a receptacle, a double walled metallic drum journaled on the receptacle so as to dip into the contents thereof, a heat conducting liquid mounted in the double walls of the drum, means for rotating said drum and a scraper contacting the surface thereof, the interior of said drum being adapted to receive a solid refrigerant.

2. In an apparatus as described the combination comprising a housing, a drum comprising a pair of telescoped cylindrical walls secured together to form a closed jacket adapted to contain a secondary refrigerant, means for rotatably mounting the drum in the casing, scraper means engaging the outer surface of the drum, a removable receptacle within the housing into which the scraper discharges and means by which the drum may be rotated, said inner cylindrical wall forming a receptacle for a primary refrigerant.

3. In an apparatus as described the combination comprising a housing, a drum comprising a pair of telescoped cylindrical walls secured together to form a closed jacket adapted to contain a refrigerating medium, means for pivotally mounting the drum in the casing, scraper means engaging the outer surface of the drum, means by which the drum may be rotated, the inner cylindrical wall being adapted to contain a solid primary refrigerant and removable closure means for the inner drum.

CLARA E. QUINN.